UNITED STATES PATENT OFFICE.

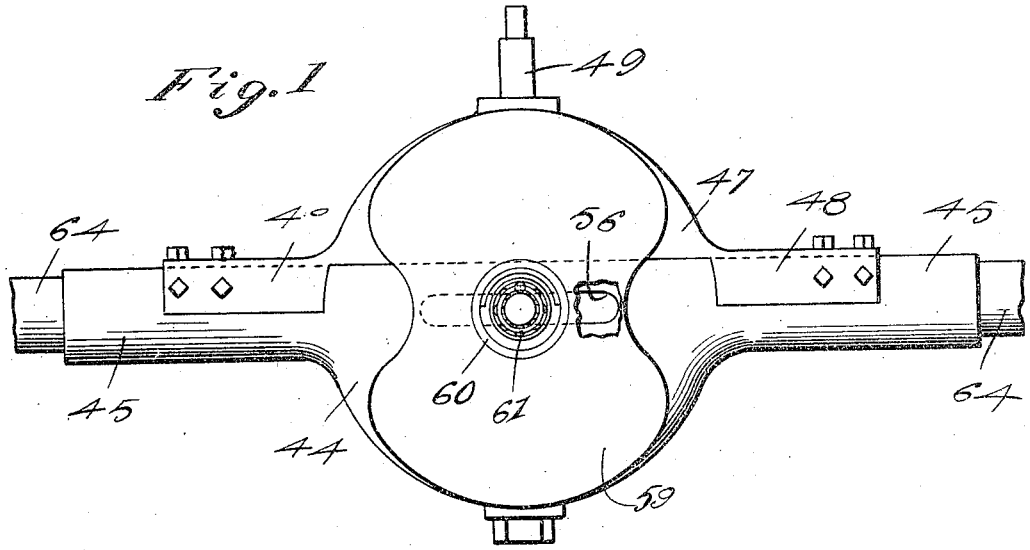
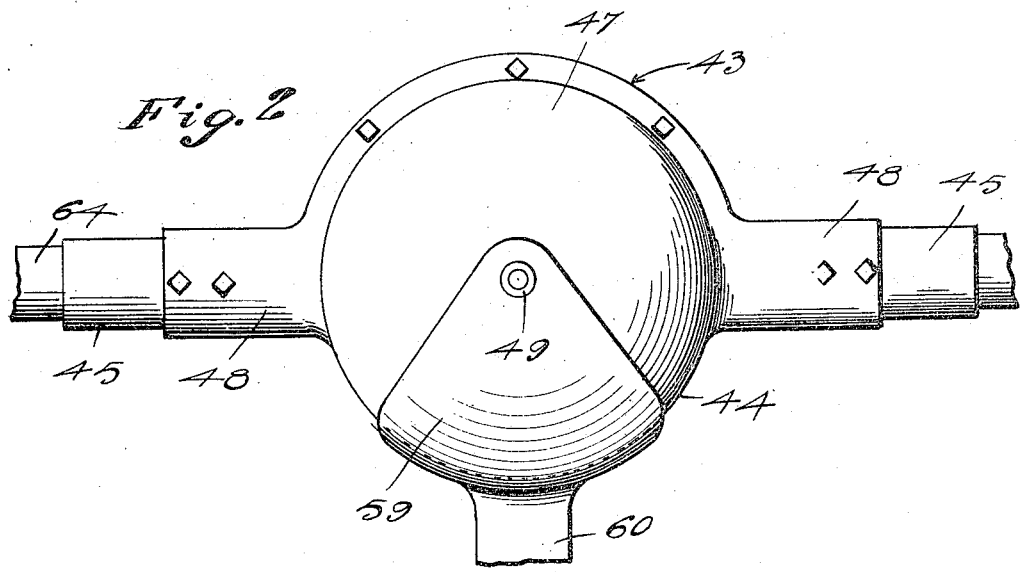
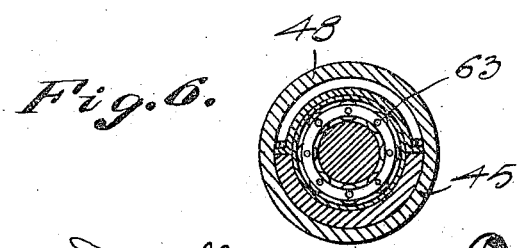

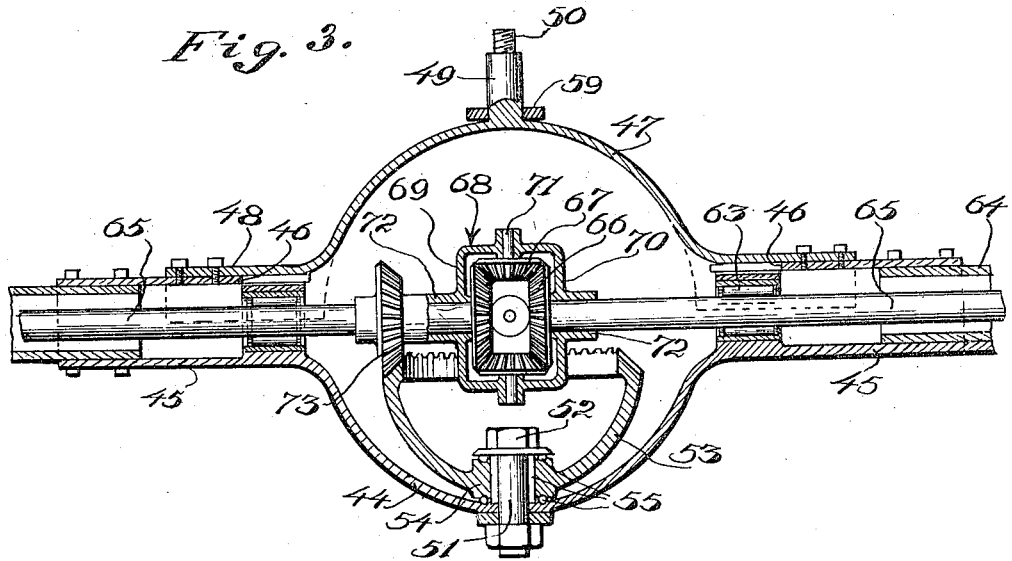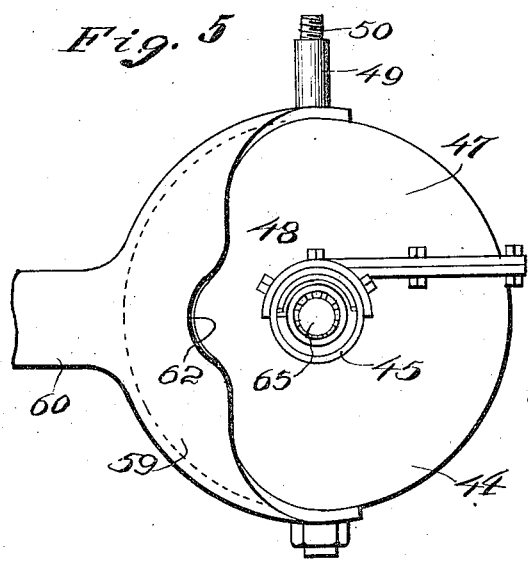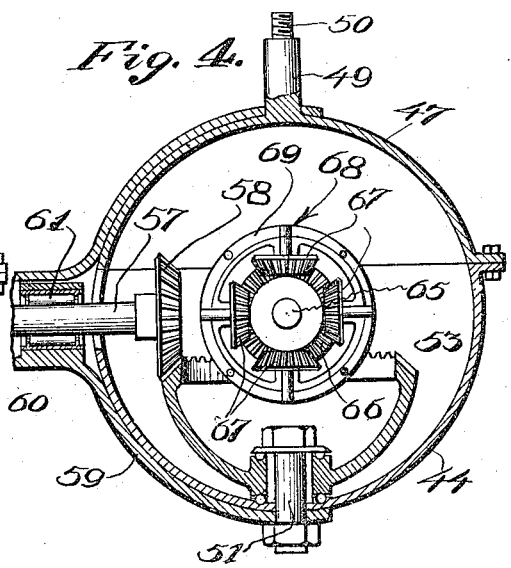

FREDERICK ELLWEIN, OF HAZEN, NORTH DAKOTA.

DIFFERENTIAL GEAR FOR MOTOR-VEHICLES.

1,241,361. Specification of Letters Patent. Patented Sept. 25, 1917.

Application filed June 7, 1916. Serial No. 102,245.

*To all whom it may concern:*

Be it known that I, FREDERICK ELLWEIN, a citizen of the United States, residing at Hazen, in the county of Mercer and State of North Dakota, have invented certain new and useful Improvements in Differential Gears for Motor-Vehicles; and I do hereby declare the following to be a full, clear, and exact description of the invention, such as will enable others skilled in the art to which it appertains to make and use the same.

This invention relates to new and useful improvements in differential gears and the principal object is to provide a device for use on vehicles having a front as well as a rear drive, thereby increasing the traction of the device.

Another object of the invention is to provide a novel form of differential gearing for both the front and rear axles of the vehicle which is so constructed as to permit the axle to turn in the same manner as the ordinary type of vehicle axle.

With these and other objects in view, the invention consists in the novel combination and arrangement of parts which will be fully set forth in the following specification and accompanying drawings, in which:

Figure 1 is a side elevation of the differential housing used for the front wheel.

Fig. 2 is a top plan view of Fig. 1.

Fig. 3 is a longitudinal sectional view through Fig. 1.

Fig. 4 is a transverse sectional view through Fig. 1.

Fig. 5 is an end elevation of Fig. 1.

Fig. 6 is an enlarged detail sectional view through one of the bearings to more clearly illustrate the details of construction thereof.

Referring to the drawings in detail the housing for the forward differential is designated by the character 43 and comprises the hemispherical body 44 which is formed at diametrically opposite points with the tubular axle housing 45. The upper portion of these tubular axle housings are cut away as at 46 and there is provided a hemispherical cap 47 having the semi-tubular extension 48 formed at diametrically opposite points which form closures for the cut away portions 46 of the tubular axle housing 45. Extending upwardly from a point centrally of the cap 47 is the king pin 49 provided with the reduced threaded extension 50 for the reception of the nut by means of which the differential housing is attached to the spring 6 above referred to. A suitable pin designated by the character 51 extends upwardly and into the lower section 44 of the housing and this pin has threaded on its upper end a suitable nut 52 for holding the differential driving gear in place on the pin 51. This differential driving gear is designated by the character 53 and consists of a basin-shaped body provided at its upper edge with a plurality of gear teeth and the hub of the gear designated by the numeral 54 is rotatably mounted on the ball and roller bearings 55 around the pin 51. The housing 44 is provided with a slot 56 in its rear wall through which the drive shaft 57 extends. The drive shaft 57 carries at its extreme rear end the drive gear 58 which meshes with the gear 53 and transmits the power from the propeller shaft to the differential gearing as will be more fully hereinafter described. Pivotally mounted on the pin 49 and the pin 51 at points above and below the body 44 and cap 47 is the cover or dust cap 59 which is formed with the central rearward extension 60, which extension is hollow and provided with the roller bearings 61 on which the shaft 57 is rotatable. This cap 59 is provided with the cut away portion 62 at diametrically opposite points which are of a size sufficient to accommodate the extensions 45 and caps 48 when the axle turns on its pivot.

Rotatably mounted in suitable bearings 63 at the inner ends of the axle housing 45 and in suitable bearings at the outer ends of the tubular casing 64 are the drive axles 65, the extreme inner ends of which are provided with the bevel gears 66 which mesh with the bevel gears 67 of the differential. The differential frame or spider is designated generally by the reference character 68 and comprises the key sections 69 and 70 carrying the stub shaft 71 on which the gears 67 are rotatably mounted. Each of these sections 69 and 70 is formed with a tubular extension 72 which is rotatable on the axles 65 and one of these tubular extensions is provided with the bevel gear 73 which meshes with the gear 53 hereinbefore described. It will thus be apparent that upon rotation of the gear 53, the gear 73 will be driven thereby causing the frame 68 to revolve and thereby moving the gears 67 in a circular path around the gear 66 and transmitting power from the propeller shaft to the axle and the drive wheel.

While in the foregoing there has been shown and described the preferred embodiment of this invention, it is to be understood that such changes may be made in the combination and arrangement of parts as will fall within the spirit and scope of the appended claims.

What is claimed is:

1. In a motor vehicle, a differential comprising a differential housing, a main differential drive gear horizontally rotatable within said housing, drive axles, the inner ends of the drive axles extending into the differential housing, gears on said inner ends, a differential frame rotatable on the inner ends of the drive axles, pinions mounted in said frame and meshing with the gears on the ends of the axles and a gear carried by the frame and meshing with the drive gear whereby when said drive gear is set in motion the axles will be driven.

2. In a differential for motor vehicles, a differential housing, a horizontally rotatable gear mounted in said housing, a drive pinion meshing therewith, drive axles extending into the housing, gears at the inner end of the drive axle, a differential frame mounted to rotate on said axles, pinions on the frame and meshing with the gears on the inner ends of the axles, a gear on the frame meshing with the horizontal drive gear and roller bearings supporting the drive gear and the axles.

In testimony whereof I affix my signature in presence of two witnesses.

FREDERICK ELLWEIN.

Witnesses:
GUST. A. MARTIN,
SYLVAN L. OLSON.